US008527718B2

(12) United States Patent
Zwisler et al.

(10) Patent No.: US 8,527,718 B2
(45) Date of Patent: Sep. 3, 2013

(54) EXPLICIT DATA SEGMENT BOUNDARIES WITH SCSI I/O REFERRALS

(75) Inventors: Ross Zwisler, Lafayette, CO (US);
Andrew J. Spry, Wichita, KS (US);
Gerald J. Fredin, Wichita, KS (US);
Kenneth J. Gibson, Lafayette, CO (US)

(73) Assignee: LSI Corporation, San Jose, CA (US)

( * ) Notice: Subject to any disclaimer, the term of this patent is extended or adjusted under 35 U.S.C. 154(b) by 442 days.

(21) Appl. No.: 12/384,028

(22) Filed: Mar. 31, 2009

(65) Prior Publication Data
US 2010/0250894 A1 Sep. 30, 2010

(51) Int. Cl.
*G06F 12/00* (2006.01)

(52) U.S. Cl.
USPC .............. 711/154; 711/6; 711/114; 711/162; 710/5; 710/36

(58) Field of Classification Search
None
See application file for complete search history.

(56) References Cited

U.S. PATENT DOCUMENTS

| 7,287,116 B2* | 10/2007 | Iwami et al. | 711/6 |
| 2007/0192554 A1* | 8/2007 | Higaki et al. | 711/162 |
| 2009/0276567 A1* | 11/2009 | Burkey | 711/114 |

* cited by examiner

*Primary Examiner* — Matthew Bradley
*Assistant Examiner* — Daniel Tsui
(74) *Attorney, Agent, or Firm* — Suiter Swantz pc llo

(57) ABSTRACT

A method for communication between an initiator system and a block storage cluster may include receiving a first command at a first storage system included in a plurality of storage systems of the block storage cluster. The method may also include transmitting a referral response from the first storage system to the initiator system when at least a portion of the data associated in the first command is stored by a second storage system. The method may further include obtaining a segment start value and a corresponding port identifier based on the referral response, and directing a second command to at least a second storage system included in the plurality of storage systems of the block cluster.

12 Claims, 2 Drawing Sheets

EXPLICIT DATA SEGMENT BOUNDARIES WITH SCSI I/O REFERRALS

TECHNICAL FIELD

The present disclosure generally relates to the field of electronic data storage, and more particularly to methods and systems for explicit data segment boundaries with SCSI I/O referrals.

BACKGROUND

Currently available systems/methods for transferring data to and from block storage clustering systems may not provide a desired level of performance.

Therefore, it may be desirable to provide system(s)/method(s) for transferring data to and from block storage clustering systems which address the above-referenced problems of currently available solutions.

SUMMARY

A method for communication between an initiator system and a block storage cluster may include receiving a first command at a first storage system included in a plurality of storage systems of the block storage cluster. The first command may be transmitted by the initiator system to the first storage system. The first command may include a request for data associated with a data transfer. The method may also include transmitting a referral response from the first storage system to the initiator system when at least a portion of the data associated in the first command is stored by a second storage system. The method may further include obtaining a segment start value and a corresponding port identifier based on the referral response, and directing a second command to at least a second storage system included in the plurality of storage systems of the block cluster. The second command may include a request for data based upon the segment start value and the corresponding port identifier.

A storage system may include means for receiving a first command at a first storage system included in a plurality of storage systems of the block storage cluster. The first command may be transmitted by the initiator system to the first storage system and may include a request for data associated with a data transfer. The system may also include means for transmitting a referral response from the first storage system to the initiator system when at least a portion of the data associated in the first command is stored by a second storage system. The system may further include means for obtaining a segment start value and a corresponding port identifier based on the referral response. The system may still further include means for directing a second command to at least a second storage system included in the plurality of storage systems of the block cluster. The second command may include a request for data based upon the segment start value and the corresponding port identifier.

A computer-readable medium may have computer-executable instructions for performing a method for communication between an initiator system and a block storage cluster, where the method may include receiving a first command at a first storage system included in a plurality of storage systems of the block storage cluster. The first command may be transmitted by the initiator system to the first storage system. The first command may include a request for data associated with a data transfer. The method may also include transmitting a referral response from the first storage system to the initiator system when at least a portion of the data associated in the first command is stored by a second storage system. The method may further include obtaining a segment start value and a corresponding port identifier based on the referral response, and directing a second command to at least a second storage system included in the plurality of storage systems of the block cluster. The second command may include a request for data based upon the segment start value and the corresponding port identifier.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 3 is an illustration of a populated virtual volume cache;

FIG. 4 is an illustration of a referral list with segment starts; and

DETAILED DESCRIPTION

Reference will now be made in detail to the subject matter disclosed, which is illustrated in the accompanying drawings.

Figure 1:
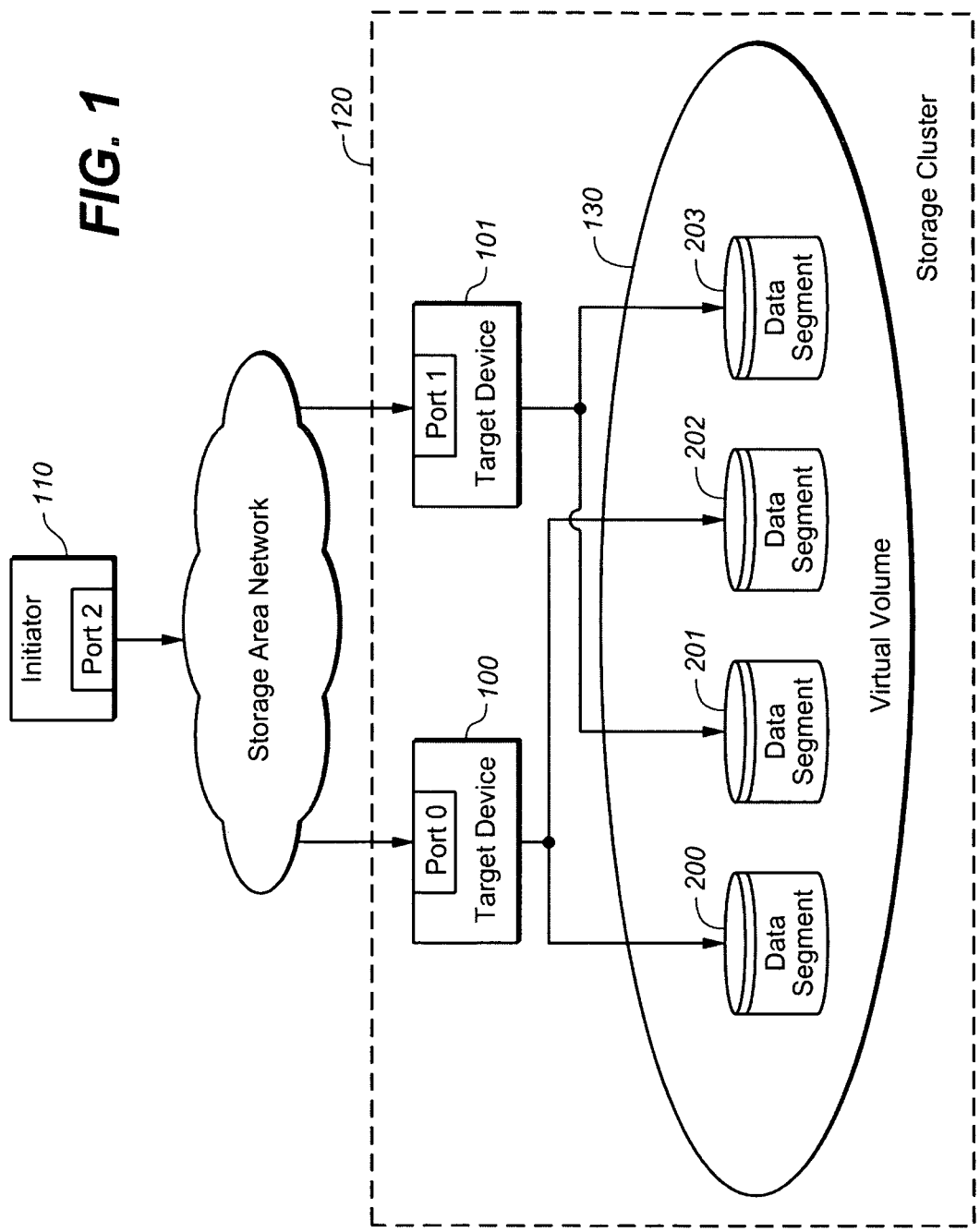
FIG. 1 is a networked storage implementation/system accessible via a block storage protocol in accordance with an exemplary embodiment of the present disclosure.

Referring to FIG. 1, an initiator system 110 is shown in communication via a storage area network with a block storage cluster. An initiator system 110 may be configured for accessing a block storage cluster 120 via a storage area network. Block storage cluster 120 may include a concatenated virtual volume 130, which may be formed by concatenating Data Segments 200, 201, 202, and 203. It may be appreciated that additional concatenating may be included, but not depicted in FIG. 1. Data Segments 200 and 202 may be accessible through Port 0 on Target Device 100, whereas Data Segments 201 and 203 may be accessible through Port 1 on Target Device 101. While the SCSI referral configuration shown in FIG. 1 is represented including the concatenated virtual volume 130, it may be appreciated that other configurations may be utilized, regardless of internal structure of the virtual volume. For instance, other suitable configurations may include volumes created by striping and any other suitable aggregation technique.

SCSI I/O referral techniques may enable an initiator system to access data on Logical Unit Numbers (LUNs) that are spread across a plurality of storage/target devices. Such referral techniques may include those discussed by U.S. application Ser. No. 12/316,713, entitled "Small Computer System Interface Input Output (SCSI IO) Referral," filed Dec. 15, 2008, the disclosure of which is hereby incorporated by reference. Target devices may be disks, storage arrays, tape libraries, and/or other types of storage devices. It is understood that an Input/Output (I/O) request may be a SCSI command, the first storage system may be a SCSI storage system, and the initiator system may be a SCSI initiator system. The SCSI command may identify the requested data by a starting address of the data and a length of the data in a volume logical block address space.

Figure 2:
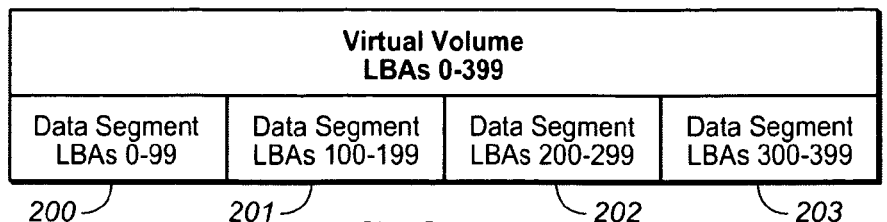
FIG. 2 is an illustration depicting a logical block access distribution for an exemplary virtual volume.

Referring now to FIGS. 2-3, an illustration depicting a logical block access distribution and a populated virtual volume cache for an exemplary virtual volume are displayed. Data Segments 200, 201, 202, and 203 are shown, such as those depicted in FIG. 1. In the embodiments shown in FIGS. 2 and 3, a data segment comprises a length of one hundred blocks. The combination of the four segments forms a Logical Block Address (LBA) distribution of a first concatenation for the virtual volume 130 of FIG. 1. Thus, as shown in FIG. 2 the total virtual volume concatenation comprises LBAs 0-399, wherein Data Segment 200 comprises LBAs 0-99, Data Segment 201 comprises LBAs 100-199, Data Segment 202 comprises LBAs 200-299, and Data Segment 203 comprises LBAs 300-399. The populated virtual volume cache of FIG. 3 may be populated by the initiator 110 according to a virtual volume caching technique. Such a virtual volume caching technique may include those described by copending U.S. patent application Ser. No. 12/383,396, entitled "Caching of SCSI I/O Referrals," filed Mar. 24, 2009, the disclosure of which is hereby incorporated by reference.

Referring now to FIG. 4, a referral list is shown in accordance with an exemplary embodiment of the present disclosure. A referral sent from a storage system of the block storage cluster may include a Segment Start value. The Segment Start $S_x$ may be the virtual volume LBA of the first block of an associated data segment, which is available through Port $P_x$. By utilizing a referral format which returns a Segment Start value and a corresponding port identifier, the present disclosure may enable a description of an LBA distribution of a virtual volume among the underlying data segments. Such a description may provide the initiator system 110 sufficient information to configure any necessary referral I/Os.

The referral format utilizing a Segment Start value and the corresponding port identifier may be further described according to the following example. An I/O request (e.g., a first command including a request for data) issued by the initiator system 110 of FIG. 1 may be presented as:

LBA 150, Length 100

If the initiator system 110 begins with an empty SCSI I/O Referral cache and if the initiator system directs I/Os to Port 0 by default, the I/O request will result in a SCSI I/O referral. In this situation, a referral may be returned to the initiator system because the data requested in the I/O request is located on more than one storage system of the block storage cluster 120. For instance, LBA 150 is the fifty-first block located on Data Segment 201, which comprises LBAs 100-199. However, the I/O request includes a length of 100 blocks beyond LBA 150. Thus, the data requested in the I/O request is stored on an additional 50 blocks on Data Segment 202, which comprises LBAs 200-299. The referrals returned from a storage system may be described by the following SCSI I/O referrals:

Segment Start 100, Port 1
Segment Start 200, Port 0

The initiator system 110 may use the returned SCSI I/O referrals, which contain the Segment Start values, to populate a referral cache. In general, the present disclosure enables an initiator system to fully populate a virtual volume's SCSI I/O Referral cache using less than or equal to ($\leqq$) N referrals, where N is the number of data segments for the given virtual volume. In the present example, the initiator system 110 may have sufficient information to split a second command (e.g., a second I/O request for data) into the following two referral I/Os:

Port 1, LBA 150, Length 50
Port 0, LBA 200, Length 50

Explicit data segment boundaries (e.g., referrals which return Segment Start values and corresponding port identifiers) in an I/O referral system may allow a storage system to avoid inefficiencies associated with referrals which employ Port, Offset, and Length values. Segment Start values and corresponding port identifiers may describe a virtual volume's LBA distribution among the virtual volume's underlying data segments, which allows an initiator system to configure the referral I/O. Port, Offset, and Length values instead describe the referral I/O itself, rather than enable the initiator system to configure a more efficient referral I/O. For instance, the following I/O sequence may be issued by the initiator system 110:

LBA 150, Length 10
LBA 140, Length 10
LBA 130, Length 10
LBA 120, Length 10

If the initiator system utilizes a Port, Offset, and Length system and includes an empty SCSI I/O Referral cache, and if the initiator system directs I/Os to Port 0 by default, each of the above I/Os will result in a SCSI I/O Referral. The referrals may be transmitted by Target Device 100, since the requested LBA ranges are included in Data Segment 201, which is accessible through Port 1 of Target Device 101. However, the four referrals will be transmitted even though all four I/Os are directed to the same underlying data segment. In this example, for each I/O, the initiator system either has no data segment Starting LBA (for the first I/O in the sequence), or the initiator system has a Starting LBA that is greater than the target LBA for the I/O (for the second, third, and fourth I/Os in the sequence). The initiator system does not have the proper I/O routing information in these instances, so it may issue each of the I/Os to the default port, Port 0 in this example. Each of the I/Os may then be redirected to Port 1 with a SCSI I/O referral, where the cached Starting LBA value for the underlying data segment would be updated in each of the four instances. An explicit data segment boundary may allow the initiator to avoid such an issue by defining a virtual volume's LBA distribution among the virtual volume's underlying data segments.

The explicit data segment boundary may also enable an initiator system to distinguish different data segments which are accessible through the same port (such as Data Segments 201 and 203 of FIG. 1). Such an instance may be explained with reference to the following I/O sequence:

LBA 350, Length 10
LBA 150, Length 10

If an initiator system utilizes a Port, Offset, and Length system and includes an empty SCSI I/O Referral cache, and if the initiator system directs I/Os to Port 0 by default, each of the above I/Os will result in a SCSI I/O Referral. Additionally, the initiator system would be unable to distinguish each I/O as being directed to separate data segments since each of Data Segments 201 and 203 are accessible through the same port (Port 1 of Target Device 101). Thus, after the above I/Os, the initiator system may include a single cache entry with a Starting LBA of 150. The initiator system would require additional SCSI referral I/Os to discover Data Segment 202, and later to rediscover Data Segment 203. An explicit data segment boundary may allow the initiator to avoid such an issue by defining a virtual volume's LBA distribution among the virtual volume's underlying data segments.

Additionally, an explicit data segment boundary in a referral may reduce the number of bytes which are returned for each SCSI I/O referral, which may allow more referrals to be employed in a limited space provided by SCSI sense data. Further, an explicit data segment boundary in a referral may be utilized without SCSI I/O referral caching being implemented by the initiator system.

Figure 5:
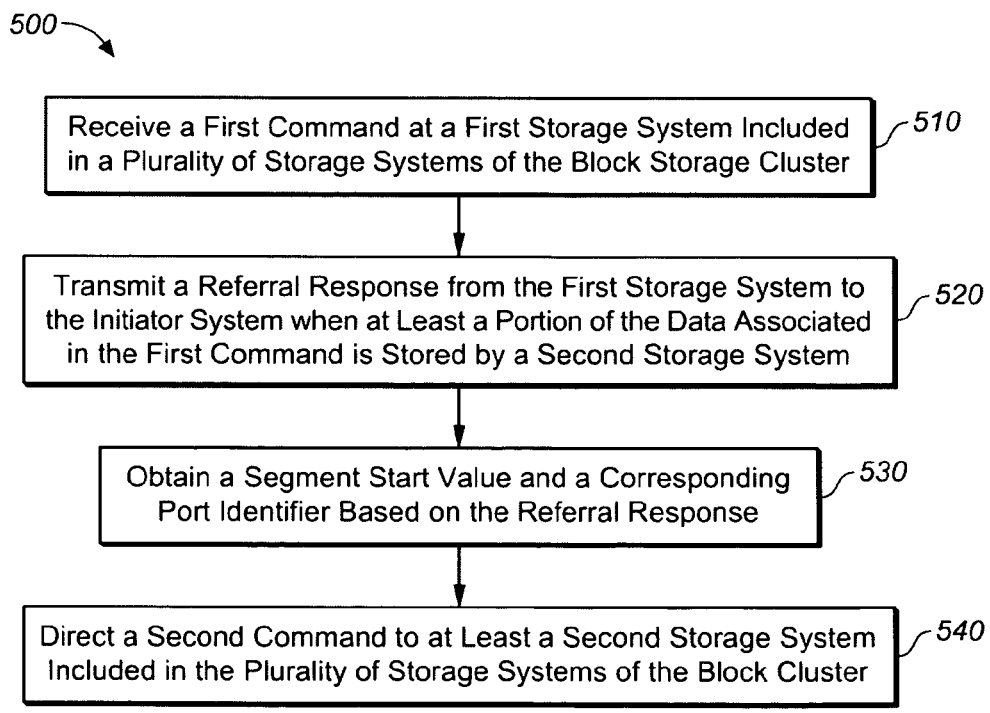
FIG. 5 is a flow chart illustrating a method for communication between an initiator system and a block storage cluster of the present disclosure, in accordance with an exemplary embodiment of the present disclosure.

Referring now to FIG. 5, a flow diagram illustrating steps performed by a communication method 500 in accordance with the present disclosure is displayed. The method 500 may be utilized in a storage system for communication between an initiator system and a block storage cluster. Step 510 may receive a first command at a first storage system included in a plurality of storage systems of the block storage cluster. The first command may be transmitted by the initiator system to the first storage system. The first command may include a request for data, such as via an I/O request.

Step 520 may transmit a referral response from the first storage system to the initiator system when at least a portion of the data associated in the first command is stored by a second storage system. Step 530 may obtain a segment start value and a corresponding port identifier based on the referral response.

Step 520 of method 500 may include transmitting a referral response including a segment start value and a corresponding port identifier from the first storage system to the initiator system when at least a portion of the data associated in the first command is stored by a second storage system. The segment start value may represent a virtual volume Logical Block Address (LBA) of a first block of a data segment of the data associated in the first command.

Step 540 may direct a second command to at least a second storage system included in the plurality of storage systems of the block cluster. The second command may include a request for data based upon the segment start value and the corresponding port identifier.

Step 540 of method 500 may include directing in parallel a plurality of commands to the first storage system and the second storage system included in the plurality of storage systems of the block cluster. Each of the plurality of commands may include a request for data stored on the respective one of the first storage system and the second storage system based upon the at least one segment start value and at least one corresponding port identifier for each of the plurality of data segments. The parallel direction of commands may be described by copending U.S. Patent Application with Express Mail Label No. EM 260723457 US, entitled "Method and System for Implementing Parallelism with SCSI IO Referrals", filed Mar. 31, 2009, the disclosure of which is hereby incorporated by reference.

Step 540 of method 500 may include directing a command to each of the first storage system and the second storage system. Each command may include a request for data based upon at least one segment start value and the corresponding port identifier.

Method 500 may further include describing an LBA distribution of the virtual volume according to a plurality of data segments by utilizing at least one segment start value and at least one corresponding port identifier for each of the plurality of data segments.

Method 500 may further include transmitting a status condition from at least one of the first storage system or the second storage system to the system initiator. The transmitting a status condition may include transmitting to the initiator system at least one of (a) a transfer complete condition when all the data associated in the second command is transferred to or transferred from the first storage system and the second storage system to the initiator system, or (b) an error when one of (i) an error occurs in at least one of the first command or the second command, or (ii) an error occurs in the transfer of data associated in at least one of the first command or the second command.

It is to be noted that the foregoing described embodiments according to the present disclosure may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present disclosure may be conveniently implemented in forms of a software package. Such a software package may be a computer program product which employs a computer-readable storage medium including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for communication between an initiator system and a block storage cluster, comprising:

receiving a first command at a first storage system included in a plurality of storage systems of the block storage cluster, the first command being transmitted by the initiator system to the first storage system, the first command including a request for data associated with a data transfer, a first portion of the data being stored by the first storage system and a second portion of the data being stored by a second storage system;

transmitting at least one referral response from the first storage system to the initiator system, the at least one referral response including a first segment start value and corresponding port identifier associated with the first storage system and a second segment start value and corresponding port identifier associated with the second storage system, the first segment start value representing a virtual volume Logical Block Address (LBA) of a first block of a first data segment including the first portion of the data associated in the first command, the second segment start value representing a virtual volume LBA of a first block of a second data segment including the second portion of the data associated in the first command; and directing in parallel a second command from the initiator system to the first storage system and a third command from the initiator system to the second storage system, each of the second command and the third command including a request for the respective one of the first portion of the data and the second portion of the data stored on the respective one of the first storage system and the second storage system based upon the first segment start value and corresponding port identifier associated with the first storage system and the second segment start value and corresponding port identifier associated with the second storage system.

2. The method of claim 1, further including:

transmitting a status condition from at least one of the first storage system or the second storage system to the initiator system.

3. The method of claim 2, wherein transmitting a status condition from at least one of the first storage system or the second storage system to the initiator system includes:

transmitting to the initiator system at least one of (a) a transfer complete condition when all the data associated in the second command is transferred to or transferred from the first storage system and the second storage system to the initiator system, or (b) an error when one of (i) an error occurs in at least one of the first command or the second command, or (ii) an error occurs in the transfer of data associated in at least one of the first command or the second command.

4. The method of claim 1, further including:

populating a referral cache utilizing the at least one referral response transmitted from the first storage system to the initiator system, the referral cache including at least a starting LBA, a length of blocks, and a port identifier for each of the first portion of the data included in first data segment and the second portion of the data included in the second data segment.

5. A storage system, comprising:

means for receiving a first command at a first storage system included in a plurality of storage systems of the block storage cluster, the first command being transmitted by the initiator system to the first storage system, the first command including a request for data associated with a data transfer, a first portion of the data being stored by the first storage system and a second portion of the data being stored by a second storage system;

means for transmitting at least one referral response from the first storage system to the initiator system, the at least one referral response including a first segment start value and corresponding port identifier associated with the first storage system and a second segment start value and corresponding port identifier associated with the second storage system, the first segment start value representing a virtual volume Logical Block Address (LBA) of a first block of a first data segment including the first portion of the data associated in the first command, the second segment start value representing a virtual volume LBA of a first block of a second data segment including the second portion of the data associated in the first command; and means for directing in parallel a second command from the initiator system to the first storage system and a third command from the initiator system to the second storage system, each of the second command and the third command including a request for the respective one of the first portion of the data and the second portion of the data stored on the respective one of the first storage system and the second storage system based upon the first segment start value and corresponding port identifier associated with the first storage system and the second segment start value and corresponding port identifier associated with the second storage system.

6. The system of claim 5, further including:

means for transmitting a status condition from at least one of the first storage system or the second storage system to the initiator system.

7. The system of claim 6, wherein the means for transmitting a status condition from at least one of the first storage system or the second storage system to the initiator system includes:

means for transmitting to the initiator system at least one of (a) a transfer complete condition when all the data associated in the second command is transferred to or transferred from the first storage system and the second storage system to the initiator system, or (b) an error when one of (i) an error occurs in at least one of the first command or the second command, or (ii) an error occurs in the transfer of data associated in at least one of the first command or the second command.

8. The system of claim 5, further including:

means for populating a referral cache utilizing the at least one referral response transmitted from the first storage system to the initiator system, the referral cache including at least a starting LBA, a length of blocks, and a port identifier for each of the first portion of the data included in first data segment and the second portion of the data included in the second data segment.

9. A non-transitory computer-readable medium having computer-executable instructions for performing a method for communication between an initiator system and a block storage cluster, the method comprising:

receiving a first command at a first storage system included in a plurality of storage systems of the block storage cluster, the first command being transmitted by the initiator system to the first storage system, the first command including a request for data associated with a data transfer, a first portion of the data being stored by the first storage system and a second portion of the data being stored by a second storage system;

transmitting at least one referral response including from the first storage system to the initiator system, the at least one referral response including a first segment start value and corresponding port identifier associated with the first storage system and a second segment start value and corresponding port identifier associated with the second storage system, the first segment start value representing a virtual volume Logical Block Address (LBA) of a first block of a first data segment including the first portion of the data associated in the first command, the second segment start value representing a virtual volume LBA of a first block of a second data segment including the second portion of the data associated in the first command; and directing in parallel a second command from the initiator system to the first storage system and a third command from the initiator system to the second storage system, each of the second command and the third command including a request for the respective one of the first portion of the data and the second portion of the data stored on the respective one of the first storage system and the second storage system based upon the first segment start value and corresponding port identifier associated with the first storage system and the second segment start value and corresponding port identifier associated with the second storage system.

10. The non-transitory computer-readable medium of claim 9, wherein the method further includes:
   transmitting a status condition from at least one of the first storage system or the second storage system to the initiator system.

11. The non-transitory computer-readable medium of claim 10, wherein transmitting a status condition from at least one of the first storage system or the second storage system to the initiator system includes:
   transmitting to the initiator system at least one of (a) a transfer complete condition when all the data associated in the second command is transferred to or transferred from the first storage system and the second storage system to the initiator system, or (b) an error when one of (i) an error occurs in at least one of the first command or the second command, or (ii) an error occurs in the transfer of data associated in at least one of the first command or the second command.

12. The non-transitory computer-readable medium of claim 9, wherein the method further includes:
   populating a referral cache utilizing the at least one referral response transmitted from the first storage system to the initiator system, the referral cache including at least a starting LBA, a length of blocks, and a port identifier for each of the first portion of the data included in first data segment and the second portion of the data included in the second data segment.

* * * * *